(12) United States Patent
Ji et al.

(10) Patent No.: US 11,300,723 B2
(45) Date of Patent: Apr. 12, 2022

(54) BACKLIGHT MODULE, LIGHT GUIDE PLATE, AND PREPARATION METHOD FOR CONDUCTIVE HYDROGEL OF LIGHT GUIDE PLATE

(71) Applicant: SHENZHEN TCL NEW TECHNOLOGY CO., LTD., Shenzhen (CN)

(72) Inventors: Honglei Ji, Shenzhen (CN); Tianying Deng, Shenzhen (CN); Kewen Qiang, Shenzhen (CN); Xijun Chen, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 7 days.

(21) Appl. No.: 16/973,960

(22) PCT Filed: Dec. 20, 2019

(86) PCT No.: PCT/CN2019/126820
§ 371 (c)(1),
(2) Date: Dec. 10, 2020

(87) PCT Pub. No.: WO2020/135240
PCT Pub. Date: Jul. 2, 2020

(65) Prior Publication Data
US 2021/0255382 A1    Aug. 19, 2021

(30) Foreign Application Priority Data
Dec. 26, 2018  (CN) .......................... 201811603495.1

(51) Int. Cl.
*F21V 8/00* (2006.01)
*G02F 1/1335* (2006.01)
(Continued)

(52) U.S. Cl.
CPC .......... *G02B 6/0041* (2013.01); *C08F 220/06* (2013.01); *C08F 222/385* (2013.01);
(Continued)

(58) Field of Classification Search
CPC ...... G02B 6/0041; G02B 6/0085; C08J 3/075; G02F 1/133606
See application file for complete search history.

(56) References Cited

U.S. PATENT DOCUMENTS

2018/0067253 A1    3/2018   Ting et al.

FOREIGN PATENT DOCUMENTS

| CN | 1807477 A | 7/2006 |
|---|---|---|
| CN | 101076697 A | 11/2007 |

(Continued)

OTHER PUBLICATIONS

World Intellectual Property Organization (WIPO) International Search Report for PCT/CN2019/126820 dated Mar. 19, 2020 6 Pages.

*Primary Examiner* — Donald L Raleigh
(74) *Attorney, Agent, or Firm* — Nathan & Associates; Menachem Nathan

(57) ABSTRACT

Backlight module, light guide plate, and preparation method for conductive hydrogel thereof. Main body of light guide plate is optical-glass material. Cavity is provided in light guide plate, filled with conductive hydrogel. Either end of light guide plate is provided with electrode electrically connected to conductive hydrogel in cavity. When not electrified, conductive hydrogel is in liquid state, when electrified, conductive hydrogel in cavity changes to gel state. Microcrystal particles are added to conductive hydrogel to improve light refection function and light diffuse reflection function of light guide plate and backlight module, to allow more light rays to penetrate through light guide plate to improve luminous efficacy. Addition of quantum (Continued)

dots or fluorescent powder to conductive hydrogel can further increase color gamut of backlight, such that liquid crystal display device has better effect.

15 Claims, 2 Drawing Sheets

(51) Int. Cl.
    *C08F 220/06*     (2006.01)
    *C08F 222/38*     (2006.01)
    *C08J 3/075*     (2006.01)
    *C08J 3/24*     (2006.01)

(52) U.S. Cl.
    CPC ............... *C08J 3/075* (2013.01); *C08J 3/24* (2013.01); *G02B 6/0085* (2013.01); *G02F 1/133626* (2021.01); *C08F 2810/20* (2013.01)

(56) References Cited

FOREIGN PATENT DOCUMENTS

| | | | | |
|---|---|---|---|---|
| CN | 201251634 Y | 6/2009 | | |
| CN | 101943823 A | 1/2011 | | |
| CN | 102472916 A | 5/2012 | | |
| CN | 103676317 A | 3/2014 | | |
| CN | 104583674 A | 4/2015 | | |
| CN | 105891936 A | 8/2016 | | |
| CN | 106249481 A | 12/2016 | | |
| CN | 106519287 A | 3/2017 | | |
| CN | 106895278 A | 6/2017 | | |
| CN | 108794773 A | 11/2018 | | |
| CN | 113717405 A | * 11/2021 | ............... | C08J 3/075 |
| JP | H0895042 A | 4/1996 | | |
| JP | H1186621 A | 3/1999 | | |
| JP | 2000131688 A | 5/2000 | | |
| TW | 201142207 A | 12/2011 | | |
| WO | WO-2007148508 A1 | * 12/2007 | ....... | B29D 11/00605 |

* cited by examiner

BACKLIGHT MODULE, LIGHT GUIDE PLATE, AND PREPARATION METHOD FOR CONDUCTIVE HYDROGEL OF LIGHT GUIDE PLATE

CROSS-REFERENCES TO RELATED APPLICATIONS

This application is a national stage application of PCT Patent Application No. PCT/CN2019/126820, filed on 20 Dec. 2019, which claims priority to Chinese Patent Application No. 201811603495.1, filed on 26 Dec. 2018, the content of all of which is incorporated herein by reference.

FIELD OF THE INVENTION

The present disclosure relates to the technical field of LED display, and to a backlight module, a light guide plate, and a preparation method for conductive hydrogel of the light guide plate.

BACKGROUND

For an LCD backlight module, a light guide plate is a main key component of an edge-type backlight module. A traditional light guide plate is mainly made of a plastic (PMMA, MS, and more), in addition, an optical-grade glass light guide plate has been successively applied in a plurality of backlight module products. In the prior art, an application of the light guide plate has a problem of heat concentration in the backlight module, making a heat dissipation design for a system insufficient.

Therefore, the current technology needs to be improved and developed.

BRIEF SUMMARY OF THE DISCLOSURE

According to the above described defects, the purpose of the present disclosure is providing a light guide plate and a backlight module thereof that is able to accelerate a heat dissipation and has a high light transmittance, as well as a preparation method for a hydrogel built in the light guide plate.

A technical solution of the present disclosure to solve the technical problems is as follows:

A light guide plate, wherein a main body of the light guide plate is made of an optical-glass material, the light guide plate has a built-in cavity, the cavity is filled with a conductive hydrogel, and each end of the light guide plate has an electrode arranged to connect electronically to the conductive hydrogel in the cavity; the conductive hydrogel is in a liquid state when it is not electrified, and becomes a colloidal state when the conductive hydrogel in the cavity is electrified.

As an improved technical solution, after the light guide plate is electrified and the conductive hydrogel forms a colloidal state before starting to work, heat of a section of the light guide plate close to a light source is increased, making an end of the light guide plate away from the light source and an end close to the light source form a temperature difference.

As an improved technical solution, the conductive hydrogel has a plurality of tiny crystal particles added to enhance a function of the light guide plate in both light reflection and light diffuse reflection.

As an improved technical solution, the conductive hydrogel is a hybrid hydrogel having a plurality of tiny crystal particles enhanced.

As an improved technical solution, the conductive hydrogel has a plurality of quantum dots added to increase a display color gamut.

As an improved technical solution, the conductive hydrogel has a plurality of fluorescent powder added to increase the display color gamut.

The present disclosure further provides a method for preparing the conductive hydrogel, applied to preparing the conductive hydrogel in the light guide plate described above, wherein comprising a plurality of following steps:

dispersing a plurality of tiny crystal particles into an aqueous solution of acrylic monomer;

applying N-methylene bisacrylamide as a cross-linking agent and potassium persulfate as an initiator, adopting an aqueous solution polymerization method to prepare a conductive hydrogel composed of polyacrylic acid and the tiny crystal particles.

As an improved technical solution, the conductive hydrogel has a plurality of quantum dots added.

As an improved technical solution, the conductive hydrogel has a plurality of fluorescent powder added.

As an improved technical solution, the conductive hydrogel is a hybrid hydrogel having a plurality of tiny crystal particles enhanced.

The present disclosure further provides a backlight module, the backlight module is an edge-type backlight module, the backlight module comprises a light guide plate, a main body of the light guide plate is made of an optical-glass material, the light guide plate has a built-in cavity, the cavity is filled with a conductive hydrogel, and each end of the light guide plate has an electrode arranged to connect electronically to the conductive hydrogel in the cavity; the conductive hydrogel is in a liquid state when it is not electrified, and becomes a colloidal state when the conductive hydrogel in the cavity is electrified.

As an improved technical solution, the conductive hydrogel has a plurality of tiny crystal particles added to enhance a function of the light guide plate in both light reflection and light diffuse reflection.

As an improved technical solution, the conductive hydrogel is a hybrid hydrogel having a plurality of tiny crystal particles enhanced.

As an improved technical solution, the conductive hydrogel has a plurality of quantum dots added, to increase a display color gamut.

As an improved technical solution, the conductive hydrogel has a plurality of fluorescent powder added, to increase a display color gamut.

Comparing to a light guide plate made of plastic in the prior art, the light guide plate in the present disclosure adopts a main body made of an optical-glass material, arranges a cavity in the light guide plate, and the cavity is filled with a conductive hydrogel, by using a character of the conductive hydrogel being in a liquid state when it is not electrified, and becomes a colloidal state when it is electrified, the conductive hydrogel converts between the liquid state and the colloidal state, and the tiny crystal particles in the conductive hydrogel make a plurality of deflections under an action of an electronic field, when a light passes through a crystal having a fixed deflection direction, an optical rotation effect happens, making the light be able to transmit in the light guide plate in the colloidal state. While the tiny crystal particles may further enhance the function of the reflection and diffuse reflection of the light, allowing more light to penetrate, so as to improve a light efficiency; if further adding a material of the quantum dots or the fluorescent powder to the conductive hydrogel, it may further improve an ultra-high color gamut of the backlight, being able to make a display effect of a liquid crystal display device better.

DETAILED DESCRIPTION OF EMBODIMENTS

In order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

Figure 1:
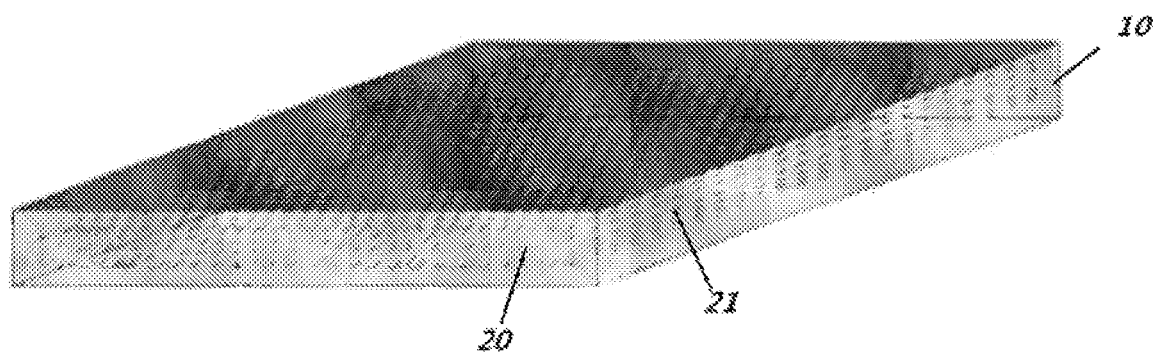
FIG. 1 illustrates a three-dimensional structural schematic diagram on the light guide plate in the present disclosure.
Figure 2:
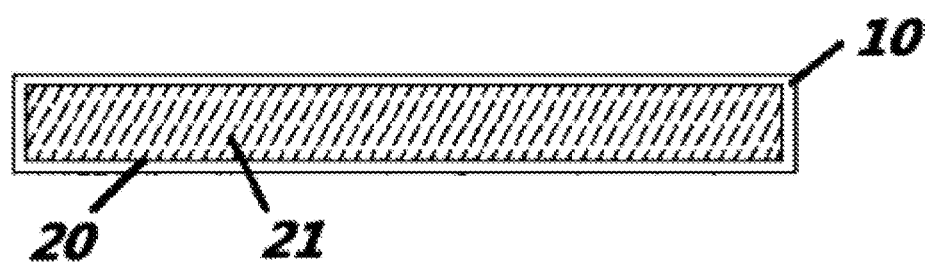
FIG. 2 illustrates a structural schematic diagram on a cross section of the light guide plate in the present disclosure.
Figure 4:
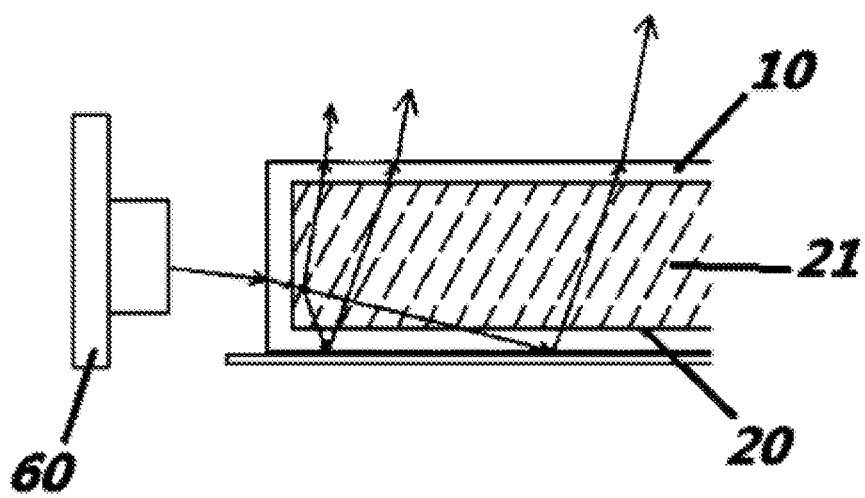
FIG. 4 illustrates a schematic diagram on a light refraction direction of the light guide plate in the present disclosure.
Figure 5:
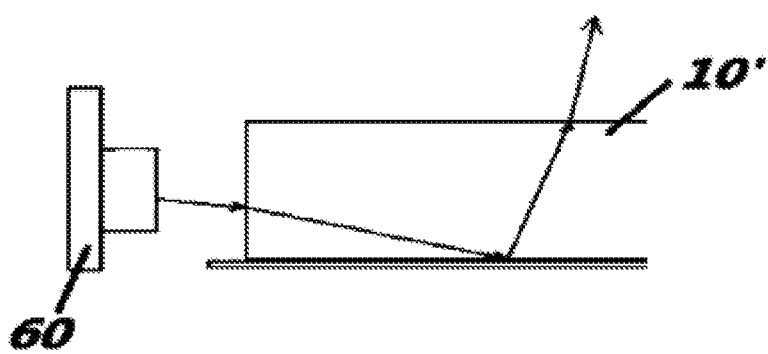
FIG. 5 illustrates a schematic diagram on a light refraction direction of the light guide plate in the prior art.

As an important part of a liquid crystal display module, an effect of a backlight module determines a display effect of the liquid crystal display module, while a light guide plate is a key part of the backlight module, and a light guide effect of the light guide plate directly determines the display effect high or low. In an edge-type backlight module, a traditional light guide plate generally adopts a plastic material, which has a poor light guide effect and easily accumulates heat, and the heat in the backlight module has no way to be effectively dissipated, making a heat dissipation design of a system rather difficult. The present application adopts an optical-grade glass material as a main material of the light guide plate. Referencing to FIG. 1 and FIG. 2, wherein FIG. 1 illustrates a three-dimensional structural schematic diagram on the light guide plate in the present disclosure; FIG. 2 illustrates a structural schematic diagram on a cross section of the light guide plate in the present disclosure. Combining FIG. 1 and FIG. 2, the main body of the light guide plate 10 of the present application is made of an optical-glass material, the light guide plate 10 has a built-in cavity 20, the cavity 20 is filled with a conductive hydrogel 21, and each end of the light guide plate 10 has an electrode arranged to connect electronically to the conductive hydrogel in the cavity (not shown in the figures); the conductive hydrogel is in a liquid state when it is not electrified, and becomes a colloidal state when being electrified. Specifically, the hydrogel is a hybrid hydrogel reinforced by a plurality of tiny crystal particles. Adding tiny crystal particles into the conductive hydrogel is able to enhance a function of the light guide plate 10 in both light reflection and light diffuse reflection. Combing with FIG. 4, which illustrates a schematic diagram on a light refraction direction of the light guide plate in the present disclosure, after a light from a light source 60 enters the light guide plate 10, the conductive hydrogel 21 in the built-in cavity 20 of the light guide plate 10 becomes a colloidal state after being electrified. When transmitting in a colloid in the light guide plate 10, the light can encounter the tiny crystal particles (not shown in the figures), since the tiny crystal particles have a function of reflecting light, the light can be reflected and diffusely reflected by the tiny crystal particles before emitting, which makes more light be able to penetrate out of the light guide plate 10, thus greatly improves a light effect of the light guide plate 10. Compared to a light guide plate in the prior art, as shown in FIG. 5, which illustrates a schematic diagram on a light refraction direction of the light guide plate in the prior art, after the light from the light source 60 enters a light guide plate 10', the light guide plate 10' transmits light in a relatively simple way, there is no diffuse reflection effect formed, thus the light effect is poor.

Figure 3:
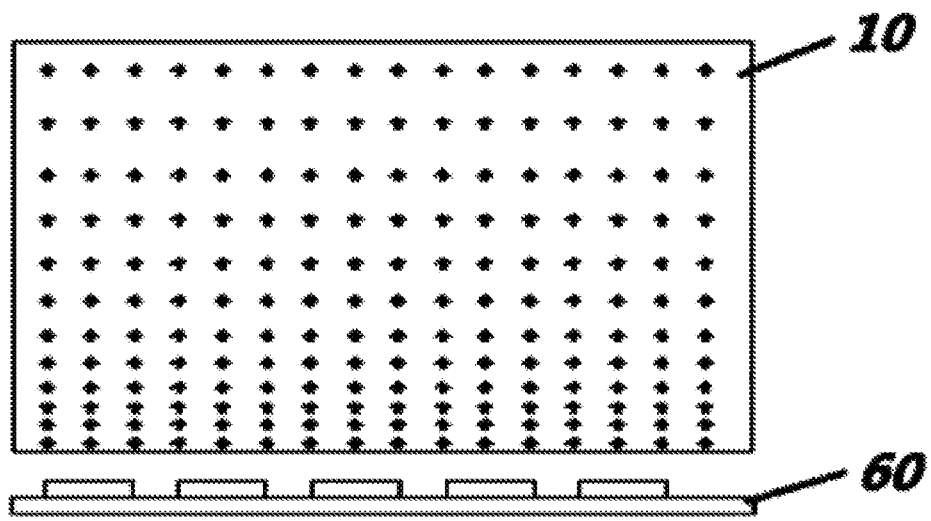
FIG. 3 illustrates a schematic diagram on a heat transmission direction of the light guide plate in the present disclosure.

In addition, for a light guide plate, due to a light guide function, it also needs a design for heat dissipation, while a method of the light guide plate in the present disclosure adopting the conductive hydrogel filled in the cavity may further improve a problem of heat dissipation in the backlight module. Shown as FIG. 3, which illustrates a schematic diagram on a heat transmission direction of the light guide plate in the present disclosure, FIG. 3 shows the heat dissipation of the light guide plate 10 in accordance with the light source 60. Since the hydrogel has not only a high light transmittance, but also a function of heat conduction. After the light guide plate 10 is electrified, the hydrogel becomes a colloid before starting to work, the hydrogel further has a characteristic of flow accelerating after being heated by the light from the light source 60. After being heated by the light source 60, heat of a section of the light guide plate 10 close to the light source 60 is increased, making an end of the light guide plate 10 away from the light source 60 and an end close to the light source 60 form a temperature difference. After the hydrogel is heated, a convective fluidity is enhanced, which continuously transmits the heat from the end close to the light source 60 to the end away from the light source 60, making the function of heat conduction of the light guide plate 10 in the present disclosure be further strengthened, that has effectively solved a problem of the backlight module on heat dissipation.

Based on the conductive hydrogel mentioned above, if a color gamut of a backlight needs to be further improved, it may further add a plurality of quantum dots or fluorescent powder into the conductive hydrogel, to increase a display color gamut, and achieve an image quality effect with an ultra-high color gamut.

The present disclosure further provides a preparation method for the conductive hydrogel in the light guide plate described above, wherein comprising a plurality of following steps:

dispersing a plurality of tiny crystal particles into an aqueous solution of acrylic monomer;

applying N-methylene bisacrylamide as a cross-linking agent and potassium persulfate as an initiator, adopting an aqueous solution polymerization method to prepare a conductive hydrogel composed of polyacrylic acid and the tiny crystal particles.

The present disclosure further provides a backlight module, the backlight module is an edge-type backlight module, composed by adopting the light guide plate described above. A plurality of specific functions of the light guide plate is as same as the light guide plate described above, thus no more details are described herein.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A light guide plate, wherein a main body of the light guide plate is made of an optical-glass material, the light guide plate has a built-in cavity, the cavity is filled with a conductive hydrogel, and each end of the light guide plate has an electrode arranged to connect electronically to the conductive hydrogel in the cavity; the conductive hydrogel is in a liquid state when it is not electrified, and becomes a colloidal state when the conductive hydrogel in the cavity is electrified.

2. The light guide plate according to claim 1, wherein after the light guide plate is electrified and the conductive hydrogel forms a colloidal state before starting to work, heat of a section of the light guide plate close to a light source is increased, making an end of the light guide plate away from the light source and an end close to the light source form a temperature difference.

3. The light guide plate according to claim 1, wherein the conductive hydrogel has a plurality of tiny crystal particles added to enhance a function of the light guide plate in both light reflection and light diffuse reflection.

4. The light guide plate according to claim 3, wherein the conductive hydrogel is a hybrid hydrogel having a plurality of tiny crystal particles enhanced.

5. The light guide plate according to claim 1, wherein the conductive hydrogel has a plurality of quantum dots added to increase a display color gamut.

6. The light guide plate according to claim 1, wherein the conductive hydrogel has a plurality of fluorescent powder added to increase a display color gamut.

7. A preparation method for a conductive hydrogel, applied to preparing the conductive hydrogel in the light guide plate according to claim 1, wherein comprising a plurality of following steps:

dispersing a plurality of tiny crystal particles into an aqueous solution of acrylic monomer;

applying N-methylene bisacrylamide as a cross-linking agent and potassium persulfate as an initiator, adopting an aqueous solution polymerization method to prepare a conductive hydrogel composed of polyacrylic acid and the tiny crystal particles.

8. The preparation method according to claim 7, wherein the conductive hydrogel has a plurality of quantum dots added.

9. The preparation method according to claim 7, wherein the conductive hydrogel has a plurality of fluorescent powder added.

10. The preparation method according to claim 7, wherein the conductive hydrogel is a hybrid hydrogel having a plurality of tiny crystal particles enhanced.

11. A backlight module, the backlight module is an edge-type backlight module, wherein the backlight module comprises a light guide plate, a main body of the light guide plate is made of an optical-glass material, the light guide plate has a built-in cavity, the cavity is filled with a conductive hydrogel, and each end of the light guide plate has an electrode arranged to connect electronically to the conductive hydrogel in the cavity; the conductive hydrogel is in a liquid state when it is not electrified, and becomes a colloidal state when the conductive hydrogel in the cavity is electrified.

12. The backlight module according to claim 11, wherein the conductive hydrogel has a plurality of tiny crystal particles added to enhance a function of the light guide plate in both light reflection and light diffuse reflection.

13. The backlight module according to claim 11, wherein the conductive hydrogel is a hybrid hydrogel having a plurality of tiny crystal particles enhanced.

14. The backlight module according to claim 11, wherein the conductive hydrogel has a plurality of quantum dots added, to increase a display color gamut.

15. The backlight module according to claim 11, wherein, the conductive hydrogel has a plurality of fluorescent powder added, to increase the display color gamut.

* * * * *